United States Patent [19]  
Eshleman et al.

[11] Patent Number: 4,872,910  
[45] Date of Patent: Oct. 10, 1989

[54] ANTISTATIC FLOOR POLISH

[75] Inventors: James M. Eshleman, Manheim; Kenneth K. Ko, West Grove, both of Pa.

[73] Assignee: Armstrong World Industries, Inc., Lancaster, Pa.

[21] Appl. No.: 231,457

[22] Filed: Aug. 12, 1988

[51] Int. Cl.$^4$ ............................................... C09G 1/10
[52] U.S. Cl. ................................ 106/3; 106/10; 106/35; 252/500; 252/518; 524/401; 524/436
[58] Field of Search ............... 106/3, 10, 35; 252/500, 252/518; 524/401, 436

[56] References Cited

U.S. PATENT DOCUMENTS 4,522,956 6/1985 Dhabhar et al. ...................... 106/35
4,600,598 7/1986 Nelson et al. ......................... 252/518
4,731,199 3/1988 Matsuo et al. ........................ 252/518

Primary Examiner—Paul Lieberman
Assistant Examiner—Willie J. Thompson

[57] ABSTRACT

Combining a carboxylated acrylic latex binder/surfactant/metal salt premix with a polymer binder/LiCl PEO complex/plasticizer premix produces a storage stable, conductive floor polish composition. Coated on a floor, the composition provides high gloss with a surface resistivity of $10^6$ ohm/sq. compared to present commercial antistatic floor polishes with a surface resistivity of $10^9$ ohm/sq.

18 Claims, No Drawings

ANTISTATIC FLOOR POLISH

FIELD OF THE INVENTION

The present invention relates to electronically conductive wax or polish compositions. In particular a new process increases antistatic protection without sacrifice of composition performance or stability.

BACKGROUND OF THE INVENTION

It has long been known that static charges which develop between isolated bodies are discharged when those bodies are brought into sufficiently close proximity or contact. Potentials as high as 30,000 volts have been reportedly generated simply by a person walking on a synthetic carpet. In recent years this phenomenon, always regarded as something of a nuisance, has become a major concern to the manufacturers of sensitive electronic equipment. A static discharge of only a few hundred volts can severely damage or ruin expensive electronic circuitry, and such damage can occur at any stage of the assembly process or during transportation or storage.

Static charges can accumulate on production workers, on assembly work surfaces, and on any of the tools and containers used in the assembly area. The need to prevent static discharge requires that the entire assembly environment be constructed from materials which will quickly dissipate static charge, effectively interconnecting all workers, surfaces and equipment with a common electrical ground.

An ever increasing demand exists for static free environments in which electronic components can be manufactured. Conductive floor waxes or polishes are commercially available to maintain antistatic protection in manufacturing as well as research areas. Yet, in spite of the desirability for such antistatic compositions to provide resistivities of $10^6$–$10^8$ ohm/sq., these commercial materials can provide resistivities of only $10^8$–$10^{10}$ ohm/sq. while maintaining clarity and smoothness.

It is known from British Patent Application No. 2,148,915, to produce electronically-conductive, water-based wax or polish compositions containing neutralized carboxylic aminoester groups and quaternary ammonium compounds and having a resistivity of about $10^9$ ohm/sq. This reference discloses the use chemicals with anionic and cationic functionalities for electrical conductivity for a composition which provides high gloss and up to 60 days of antistatic protection. However, when high levels of quaternary ammonium compounds are used in these compositions to give resistivities below $10^9$ ohm/sq., the moisture sensitivity increases to a level where film toughness is jeopardized.

Antistatic polishes and waxes produced prior to the present invention exhibit several deficiencies in appearance and performance. Some give a hazy appearance or fail to give a smooth and durable surface in that the wax or polish is networked with microcracks. Not only do they have an undesirable appearance, but they crack and peel prematurely. Thus, a continuing need existed for an antistatic polish which provides lasting protection against antistatic discharging without haze or microcracking.

Within the last decade, extensive studies have been undertaken on metal salt/polymer complexes as electrical conductors. With the metal ion coordinated within a polymer matrix, the mechanism of conductance has sometimes been referred to as charge conductance. While the mechanism may be subject to controversy, several factors influencing the conductivity of these complexes are: (a) strong acid groups in the complex, (b) mobility of the complex, (c) solvent in which the complex is formed.

Alkali metal salt/polyethylene oxide complexes and their thermal and mechanical properties have been reported in references such as: C. Robitaille and J. Prud'-Lomme, *Macromolecules*, 16, 665 (1983); J. M. Parker, P. V. Wright and C. C. Lee, *Polymer*, 22, 1305 (1981); and D. R. Payne and P. V. Wright, *Polymer*, 23, 690 (1982). While very good conductivity was reported for lithium salt complexes, Bekturov et al., *Makromol. Chem., Rapid Commun.*, 6, 515 (1985), reported the stability of metal thiocyanate/PEO complexes as $Na^+ > K^+ > NH_4^+ > Li^+$. This suggests that the less stable $Li^+$/PEO complexes are providing the best conductivity. Thus, metal ions which complex too strongly may be too immobile to provide the best electrical conductivity. Yet, in spite of what was known about conductivity of metal salt/PEO complexes, it remained for the present invention to detail the composition and preparation of an improved antistatic floor polish.

SUMMARY OF THE INVENTION

The present invention provides an improved conductive wax or polish composition comprising: at least one metal crosslinking latex binder and a metal salt/polymer matrix where the polymer is polyethylene or polypropylene oxide, wherein the coated composition has a resistivity of $10^6$ to $10^8$ ohm/sq. The composition has excellent shelf-life and stability while providing high gloss without cracking or streaking even though higher levels of metal ion are incorporated than with prior art waxes or polishes. Optionally, the was contains one or more additional binders selected from the group consisting of copolymers of acrylate, urethane, or styrene.

A preferred composition comprises:
(a) a carboxylated acrylic latex binder, (b) a coalescence agent combined with the latex binder, (c) a complex of a lithium salt and polyethylene oxide, (d) a non-ionic surfactant, (e) at least one plasticizer, (f) at least one additional binder selected from the group consisting of copolymers of acrylate, urethane or styrene, and (g) a lithium salt; wherein (c) and (g) combined are no more than 4% by weight of the total composition.

A method for producing the improved composition comprises the steps:

(a) combining an acrylic binder with a surfactant and a metal salt to produce an aqueous mixture (a);

(b) combining a binder with a metal salt/polymer matrix where the polymer is polyethylene or polypropylene oxide to produce an aqueous mixture (b);

(c) combining (a) and (b) to produce a polish or wax composition with a conductivity of $10^6$ to $10^8$ ohm/sq. when coated on a surface.

In a preferred method, the acrylic binder is carboxylated, the metal salt is monovalent and the surfactant is non-ionic.

A preferred composition and method employs:

| | |
|---|---|
| Carboxylated Acrylic Latex Binder | 25–60% |
| Polyethylene Oxide Emulsion | 1–4% |
| LiCl | .5–4% |
| Surfactant | 0–2% |
| Plasticizer | 0–1.5% | where the lithium chloride is added in two separate portions to the acrylic binder to give the final composition.

DETAILED DESCRIPTION OF THE INVENTION

The present invention involves a process and composition of matter for producing electrically conductive polish or wax materials useful for areas where it is important to prevent electrostatic discharge. These materials are formulated to contain sufficient metal salt such as lithium chloride or calcium acetate that they exhibit excellent conducting properties ($10^6$–$10^8$ ohm/sq.) when coated on a vinyl flooring surface. It has been discovered that the new process of the present invention must be employed in order to incorporate sufficient metal salt without destabilizing the formulation or sacrificing its physical appearance as a coating. Separate combinations of metal salt and polymer binder must be mixed together to produce the compositions of the present invention.

Emulsified polymers used in the formulation of a floor polish system are generally negative in charge. Adding alkali or alkaline earth salts to these negatively charged polymers tends to destabilize the emulsion. Thus, prior to the present invention, the polymer would gel and a film of the composition would crack and streak when high enough levels of metal salt were added to give higher conductivity than existing commercial products. Now it has been discovered that past problems can be averted when a metal salt is premixed with a polyethylene or polypropylene oxide wax emulsion before mixing with other mixtures and/or ingredients to produce a coating composition.

Coalescence agents are employed in wax or polish compositions to convert the composition from an emulsion to a film when applied to a surface. Many coalescence agents included in the wax emulsions are commercially available. Preferred coalescence agents include butyl cellusolve, dialkyl glycol ethers and tributoxyethyl phosphate.

Metal salts comprising $Na^+$, $K^+$, $Li^+$, $Ca^{++}$, $Ba^{++}$, $Sr^{++}$ cations with chloride, iodide, bromide, thiocyanate, acetate or nitrate anions can be employed for producing the metal salt/polymer matrix. Lithium chloride is a preferred metal salt.

It has been discovered that metal salts such as LiCl and metal salt/polymer complex can be employed within the wax or polish composition up to a limit of 7% by weight without adversely affecting appearance and performance. Thus, with 9.4% by weight LiCl in a test composition, the coating showed unacceptable cracking. Added as a conductive polymer complex, the coordinated lithium compound conducts without the salt exuding to the surface where moisture absorption caused by the hygroscopic metal salt can create undesirable dirt pickup and slipperiness.

While lower quantities are effective in improving conductivity, it is preferred to use about 4% lithium chloride added as both salt and polymer complex.

While polyethylene or polypropylene oxides are the wax emulsion polymers used to produce a preferred electroconductive metal salt/polymer matrix, other emulsion polymers and polymer binders can be usefully incorporated along with the metal salt/polymer matrix to provide required physical properties for a floor wax composition. Useful polymers include polyurethanes, acrylate copolymers, acrylic acid terpolymers, polyvinyl alcohol, polyethylene glycol, styrene-maleic anhydride copolymer, polyethylene polymers and copolymers which are commercially available from Rohm & Haas, American Hoechst, Union Carbide, Allied Chemicals, Eastman Chemicals, etc.

A non-ionic surfactant is employed which is compatible with the formulation. While many suitable surfactants are commercially available for this purpose, a preferred surfactant is Triton® N101 (nonylphenoxypolyethoxy ethanol) available from Rohm & Haas.

Other components conventionally employed in the wax or polish formulation include plasticizers, defoamers, coalesence agents, antistats, and crosslinking agents; which can be used as known in the art.

Useful ranges for various components which can be employed to provide conductive, aqueous-based waxes or polishes are as follows:

| | |
|---|---|
| Carboxylated acrylic latex binder | 25–60% |
| Polymer latex binder | 0–15% |
| (acrylate, urethane, styrene, etc.) | |
| Polyethylene or polypropylene oxide Emulsion | 1–4% |
| Metal salt | 0.5–4% |
| Surfactant | 0–2% |
| Plasticizer | 0–1.5% |
| Leveling agent | 0–4% |
| Coalescence agent | 2.5–15% |
| Water | Up to 100% |

In detail, the method of the present invention involves two premixes combined with final addition ingredients to form the storage stable composition. Procedures for the first premix involve combining acrylic binder with surfactant prior to adding the metal salt.

Procedures for the second premix involve preparing the metal salt/polyethylene oxide complex and then combining it with binder and plasticizer.

The two premixes are combined along with other ingredients such as leveling agents, defoamers, plasticizers, surfactants, antistats, coalescence agents, etc. When these pecautions are taken, it is possible to produce a final emulsion which can meet or surpass the requirements of electronic industry for a storage stable product with excellent antistatic and floor protection properties.

The process and product of the present invention can be employed wherever a transparent and conductive surface coating can provide antistatic protection.

The following examples illustrate the practice of the present invention wherein Example 1 represents the best mode. Parts indicated are by weight and the test conditions are standard ASTM tests.

EXAMPLE 1

Composition

| | Parts |
|---|---|
| Part A | |
| H₂O | 30.00 |
| Acrylic latex binder solution A* (See below) | 40.00 |
| Nonionic Surfactant (Triton N101 from Rohm & Haas) | 0.50 |
| LiCl (25% aqueous solution) | 1.25 |
| Part B | |
| H₂O | 7.25 |
| 50/50 mixture of oxidized polyethylene emulsion and LiCl (25% aqueous solution) | 5.00 |
| Acrylic copolymer emulsion (Syntran 1292 from Interpolymer Corp.) | 15.00 |

| | |
|---|---|
| Plasticizer (dibutyl phthalate) | 1.25 |
| | 100.00 |

*The acrylic binder emulsion Part A was prepared using the formulation given below.

| | |
|---|---|
| Acrylic copolymer emulsion (Neocryl A-623 from Polyvinyl Chemical Ind.) | 57.14 |
| Diethylene glycol monomethylether | 14.29 |
| $H_2O$ | 28.57 |
| | 100.00 |

Procedure

In the preparation of this formulation, the acrylic binder Part A was mixed first before introducing the other ingredients. In order to avoid the coagulation of the acrylic emulsion during the mixing procedure, the LiCl solution was added after other components in Part A were homogeneously mixed. After Part A and Part B were well mixed separately, they were brought together and stirred until a homogeneous mixture was obtained. Two coats of the final composition were applied on a glass plate or a vinyl tile using a slightly damp sponge floor polish applicator. After air drying, the polish coating was conditioned at 50% RH and ambient temperatures conditions (70° F.). The surface resistivity of the coating measured at 50% RH was $6.0 \times 10^6$ ohm/sq. Without the LiCl, a similar polish system had a resistivity of $>10^{11}$ ohm/sq. The final coating had absolute clarity and good glossy appearance.

Comment

While the concentration of the LiCl was important in determining the conductivity of the final polish structure, the process for introducing the LiCl (or other metal salts) into the system was important for the stability of the emulsion polish composition. This is especially true when a relatively large amount of LiCl such as used here is employed. More specifically, if the LiCl were added all at once, the polish system would be destabilized causing poor film formation, streaks and cloudiness to the final polish coating.

EXAMPLE 2

Composition

| | Parts |
|---|---|
| Part A | |
| $H_2O$ | 21.43 |
| Carboxylated acrylic resin emulsion (10% solid) (Carboset 526 from B. F. Goodrich) | 14.29 |
| Modified Carboset XL-11* (20% solid) | 21.43 |
| Non-ionic Surfactant (Triton N-101 from Rohm & Haas) | 0.36 |
| LiCl (25% aqueous solution) | 0.71 |
| Part B | |
| $H_2O$ | 7.32 |
| 50/50 Mixture of Oxidized Polyethylene Emulsion and LiCl Solution (25% aqueous solution) | 5.00 |
| Acrylic copolymer emulsion (Syntran 1292 from Interpolymer Corp.) | 28.57 |
| Tributoxyethylphosphate | 0.89 |
| | 100.00 |
| **Modified Carboset XL-11* (Solution A)** | |
| Carboset XL-11 (carboxylated acrylic resin Emulsion from B. F. Goodrich) | 66.67 |
| Diethylene glycol monomethylether | 10.66 |
| $H_2O$ | 22.67 |

| | Parts |
|---|---|
| | 100.00 |

Procedure

The process of preparing this composition was the same as that in Example 1. The resulting coating had a resistivity of $7.2 \times 10^6$ ohm/sq. measured at 50% RH at room temperature. Just as Example 1, the coating from this composition was clear with good gloss.

As indicated, the systems of Example 1 and Example 2 are more or less identical to each other except in the resin binders used in the formulation. The behavior of the resulting polish coatings was very similar in appearance and in charge dissipative characteristics.

What is claimed is:

1. A conductive composition comprising at least one metal crosslinking latex binder and a metal salt/polymer matrix where the polymer is polyethylene or polypropylene oxide.

2. The composition of claim 1 wherein the polymer matrix is polyethylene oxide.

3. The composition of claim 2 wherein the metal salt is lithium chloride.

4. The composition of claim 3 having a surfactant of nonylphenoxypolyethoxy ethanol.

5. An aqueous conductive floor polish comprising on a weight basis:

| | |
|---|---|
| Acrylic carboxylated latex binder | 25–60% |
| Polyurethane binder | 0–15% |
| Polyethylene or polypropylene oxide | 1–4% |
| Metal salt | 0.5–4% |
| Nonionic surfactant | 0–1.5% |
| Plasticizer | 0–1.5% |

6. The polish of claim 5 containing the surfactant nonylphenoxypolyethoxy ethanol.

7. The polish of claim 6 containing the plasticizer dibutyl phthalate.

8. A method for producing a water-based, conductive wax or polish coating composition comprising the steps:
   (a) combining an acrylic latex binder with a surfactant and a metal salt to produce an aqueous mixture (a);
   (b) combining a binder with a metal salt/polymer matrix where the polymer is polyethylene or polypropylene oxide to produce an aqueous mixture (b);
   (c) combining (a) and (b) to produce a polish or wax composition with a surface resistivity of $10^6$ to $10^8$ ohm/sq. when coated on a surface.

9. The method of claim 8 in which the acrylic binder is carboxylated.

10. The method of claim 9 in which the metal salt is monovalent.

11. The method of claim 10 in which the metal salt is lithium chloride.

12. The method of claim 11 in which the surfactant is nonionic.

13. The method of claim 12 in which the surfactant is nonylphenoxypolyethoxy ethanol.

14. The method of claim 13 wherein a plasticizer is added to (b).

15. The method of claim 14 wherein the plasticizer is dibutyl phthalate.

16. The method of claim 15 wherein the binder comprises 25-60% of the composition.

17. The method of claim 16 wherein lithium chloride comprises 0.5% to 4.0% of the composition.

18. A conductive wax or polish composition comprising:
 (a) a carboxylated acrylic latex binder,
 (b) a coalescence agent combined with the latex binder,
 (c) a complex of a lithium salt and polyethylene oxide
 (d) a nonionic surfactant, (e) at least one plasticizer,
 (f) at least one additional binder selected from the group consisting of copolymer of acrylate, urethane or styrene, and (g) a lithium salt; wherein (c) and (g) combined are no more than 4% by weight of the total composition.

* * * * *